United States Patent

[11] 3,544,789

[72] Inventor Irwin Wieder
 Santa Clara, California (459 Panchita Way, Los Altos, CA 94022)
[21] Appl. No. 715,463
[22] Filed March 4, 1968
[45] Patented Dec. 1, 1970

[54] ATOMIC ABSORPTION DETECTION OF GIVEN SUBSTANCES INDEPENDENT OF ABSORPTION BY BACKGROUND SUBSTANCES
5 Claims, 2 Drawing Figs.

[52] U.S. Cl. .................................................. 250/43.5, 250/44
[51] Int. Cl. ................................................. G01h 21/26
[50] Field of Search .................................... 250/43.5, 44; 356/206; 250/226

[56] References Cited
UNITED STATES PATENTS
3,413,482 11/1968 Ling .............................. 250/226

Primary Examiner—Archie R. Borchelt
Assistant Examiner—A. L. Birch
Attorneys—Jerald E. Rosenblum and Warren M. Becker ABSTRACT: A vapor detector in which the atomic absorption of a given substance is measured, independently of any absorption by background substances, by comparing the absorption of radiation by a sample at two different wavelengths. The first wavelength is a strong atomic absorption wavelength of the given substance, and the second wavelength is separated from the first wavelength by a wavelength separation which is sufficiently large that the second wavelength is substantially unabsorbed by the strong atomic absorption of the given substance but is sufficiently small that the second wavelength is absorbed by background substances substantially the same as the first wavelength. In the preferred embodiment, the two radiations are generated by discharge envelopes inductively coupled to the tank coils of two r-f oscillators energized by a common power supply, with the radiation beam from each discharge being directed through the sample, and either the transmitted or scattered radiation from the sample is intercepted by a photomultiplier tube which detects the intensity of the intercepted radiation. A chopper alternately interrupts each beam to provide a photomultiplier signal which is phase-detected to give one output signal representative of the absorption at one wavelength and a second output signal representative of the absorption at the other wavelength, and these two output signals are compared to give a background-free indication of the atomic absorption. In an example, the atomic absorption of mercury vapor at 2537 Angstroms is detected by using one discharge envelope containing $H_{g202}$ and the other discharge envelope containing $H_{g198}$.

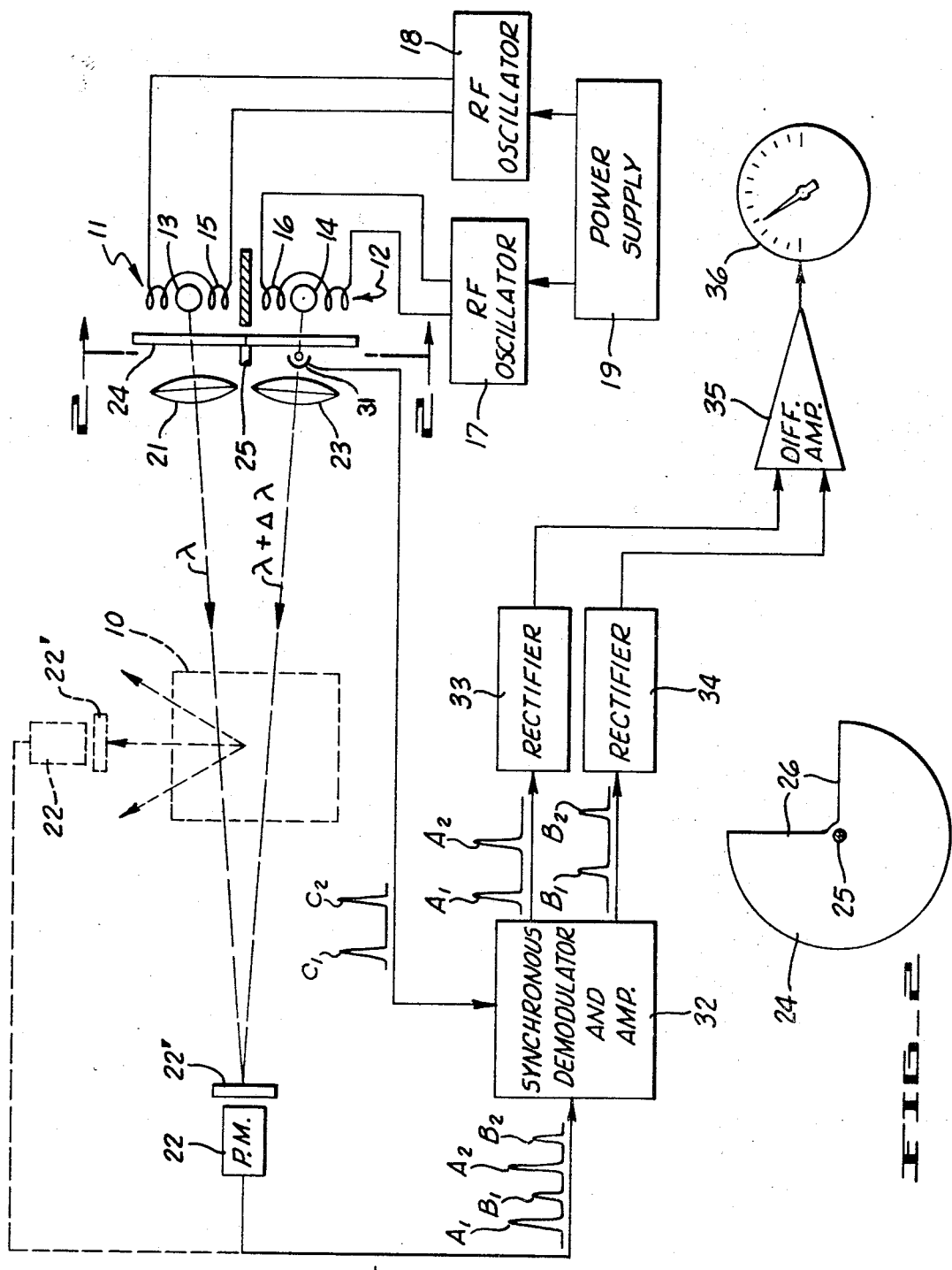

3,544,789

ATOMIC ABSORPTION DETECTION OF GIVEN SUBSTANCES INDEPENDENT OF ABSORPTION BY BACKGROUND SUBSTANCES

BACKGROUND OF THE INVENTION

Atomic absorption is an analysis technique wherein an atomic vapor of a substance to be detected is placed in the path of a beam of radiation containing a spectral line of the substance, and the absorption of the radiation is measured to provide an indication of the amount of the substance in the radiation beam.

Recently there has been considerable interest in atomic absorption equipment for in situ detection of mercury vapor in geochemical analysis, using a beam containing the 2537 Angstroms ultra-violet resonance radiation line of mercury as the absorbed spectral line. Successful use of the atomic absorption technique for such analysis requires elimination or compensation of the absorption of the 2537 Angstroms radiation by background substances such as organic vapors containing cyclic compounds which are liberated from certain soils and sulfur dioxide which is liberated from certain rocks. An article by A. R. Barringer entitled "Interference-free Spectrometer for High-sensitivity Mercury Analyses of Soils, Rocks and Air," published in the Transactions of the Institution of Mining and Metallurgy, Section B, Volume 75, Bulletin No. 714 (1966) describes techniques previously proposed to overcome the problem of background absorption. In these prior devices, absorption is compared in two separate paths and either it is necessary to use a material which preferentially removes the mercury from one absorption path, or it is necessary to preferentially absorb the bulk of the mercury radiation in one absorption path. These prior devices are undesirably complex in their structure and/or operation, and they utilize techniques which cannot in general be extended to substances other than mercury.

One object of the present invention is to provide a new technique for making atomic absorption measurements in the presence of background substances.

Another object of the present invention is to provide such a technique which is applicable to the detection of a wide range of substances.

Still another object of the present invention is to provide equipment for rapid, convenient, and reliable atomic absorption analysis. In accordance with the above stated objects, a principal feature of the present invention is the utilization of two sources of radiation, one or both of which may be enriched with different isotopes of the substance to be detected. If both are enriched one of said isotopes is found abundant in nature and the other of said isotopes is found in considerably less abundance in nature.

SUMMARY OF THE INVENTION

In accordance with the present invention, the atomic absorption of a given substance is measured independently of any absorption by background substances by: detecting the absorption by a sample of a first radiation having a first strong spectral emission line at a strong atomic absorption wavelength of said given substance; detecting the absorption by said sample of a second radiation having a second strong spectral emission line separated in wavelength from said first spectral line such that said second radiation is substantially less absorbed by the atomic absorption of said given substance than is said first radiation, but is absorbed by background substances substantially the same as said first radiation; and comparing said detected absorptions by said sample of said first and second radiations.

DESCRIPTION OF DRAWING

The various features and advantages of the present invention will become more apparent upon a consideration of the following description taken in connection with the accompanying drawing, wherein:

FIG. 1 is a partially-schematic side elevational view of an atomic absorption detector in accordance with the present invention; and FIG. 2 is a front elevational view taken along line 2-2 in FIG. 1.

DESCRIPTION OF PREFERRED EMBODIMENT

Referring to FIG. 1, a sample region 10 contains a vapor having a strong atomic absorption line at wavelength $\lambda$. Two radiation beams, one having a strong spectral emission line at wavelength $\lambda$ and the other having a strong spectral emission line at wavelength $\lambda + \Delta\lambda$, are directed through the sample region 10. The term "strong" as applied to an emission or absorption line of a substance at a particular wavelength is used herein to mean a predominant line in a multiplicity of lines as would be caused, for example, by a mixture of isotopes in which there is a predominant abundance of one of the isotopes.

The wavelength separation $|\Delta\lambda|$ is sufficiently large that the radiation of wavelength $\lambda + \Delta\lambda$ is substantially unabsorbed by said atomic absorption line of the vapor in the sample region 10, and yet is sufficiently small that the background absorption, which is typically a broadband absorption, is substantially the same for the wavelength $\lambda + \Delta\lambda$ as it is for the wavelength $\lambda$. A suitable value for $|\Delta\lambda|$ is three times the linewidth of the strong atomic absorption line of the vapor in the sample region 10 at the wavelength $\lambda$. Since the substance under detection preferentially absorbs the $\lambda$ beam, and the background substances absorb both the $\lambda$ beam and the $\lambda + \Delta\lambda$ beam substantially equally, an accurate measurement of the absorption by the substance under detection only can be obtained by comparing the separate absorptions of the two beams.

The beams at the wavelengths $\lambda$ and $\lambda + \Delta\lambda$ are generated by two separate radiation sources 11 and 12. Convenient sources for this purpose, capable of producing atomic spectral lines for a wide range of substances, are two electrodeless discharge lamps in which radiating substances are placed in evacuated envelopes 13 and 14, respectively. The envelopes 13 and 14 are inductively coupled to the tank coils 15 and 16 of stabilized r-f oscillators 17 and 18, respectively, to thereby generate a glow discharge in each of the envelopes 13 and 14. External heat may be added to the envelopes 13 and 14, if necessary, to obtain the proper vapor pressure for generating a discharge.

If the strong absorption line $\lambda$ of the substance to be detected in the sample region 10 is the predominant line in a multiplicity of lines, the radiating substance in the envelope 13 may be the same substance with either the same isotopic composition as the sample substance or isotopically enriched in the abundant isotope to even further emphasize the predominant emission line $\lambda$, and the radiating substance in the envelope 14 may also be the same substance with the predominant emission line shifted to $\lambda + \Delta\lambda$ as, for example, by enrichment in an isotope not occurring in substantial abundance in the sample vapor, application of an external field, or addition of a buffer gas.

In order to insure stability of operation, it is desirable to energize the two oscillators 17 and 18 from a common power supply 19. In the system of FIG. 1, an a.c. system is used to compare the absorption of the two beams. It is also possible to use a d.c. detection system, for example in which a separate photodetector generates a signal responsive to the intensity of each beam after it has passed through the sample region 10 and the two signals are compared in a bridge circuit or a differential amplifier, and in that case it is particularly advantageous to use a common power supply 19.

The beam containing the strong line at wavelength $\lambda$, generated by the discharge in the envelope 13, is focused by a lens 21 on a photomultiplier tube 22 (solid line); and the beam containing the strong line at wavelength $\lambda + \Delta\lambda$ generated by the discharge in the envelope 14, is focused by a lens 23 also on the photomultiplier tube 22. A filter 22' may be placed in front of the photomultiplier 22 to reject unwanted wavelengths. The radiation of the two beams is alternately interrupted by a chopper 24 in the paths of the beams. The chopper 24 is attached to an axially-extending spindle 25 which is driven for rotation by any suitable means (not shown). The chopper 24 is opaque to the radiation of sources 11 and 12 except for a transparent radial segment 26 cut therein. As the spindle 25 is rotated, the segment 26 alternately passes in front of the two beams and thus causes alternate pulses of radiation at $\lambda$ and $\lambda + \Delta\lambda$ which have passed through the sample region 10, to be admitted to the photomultiplier 22. The output of the photomultiplier 22 is thus a series of pulses $A_1$, $A_2$ due to the radiation $\lambda + \Delta\lambda$ which is substantially unabsorbed by the substance to be detected, alternating with pulses $B_1$, $B_2$ due to the radiation $\lambda$ which is absorbed by the substance to be detected. The difference between the amplitude of the pulses $A_1$, $A_2$ and the amplitude of the pulses $B_1$, $B_2$ is thus representative of the difference between the absorption of the $\lambda$ radiation and the $\lambda + \Delta\lambda$ radiation which difference, in turn, varies with the concentration of the substance to be detected in the sample region 10.

As an alternative to monitoring the intensity of the transmitted beams as a measure of the absorption of the $\lambda$ and $\lambda + \Delta\lambda$ radiations, said absorption may be measured by monitoring the reradiated or scattered radiation induced by the absorbed radiation. Such scattered radiation is indicated by the broken line arrows emanating from the sample region 10. In accordance with well-understood principles of physics, the intensity of the scattered radiation varies directly with the absorption of the transmitted radiation. If the photocell 22 is placed at right angles to the transmitted beam to intercept the scattered radiation beam, as indicated by broken lines in the drawing, the signal generated thereby as the chopper 24 rotates is also a series of pulses $A_1$, $B_1$, $A_2$, $B_2$ of alternating amplitude, except that the pulses $B_1$, $B_2$, due to the $\lambda$ radiation preferentially absorbed by the sample are now larger, rather than smaller, than the pulses $A_1$, $A_2$ due to the $\lambda + \Delta\lambda$ radiation. However, the difference between the amplitude of the pulses $A_1$, $A_2$ and the amplitude of the pulses $B_1$, $B_2$, although of opposite sign, is still representative of the difference between the absorption of the $\lambda$ radiation and the $\lambda + \Delta\lambda$ radiation which difference, in turn, varies with the concentration of the substance to be detected in the sample region 10. The subsequent description is applicable to either the transmission or scattered mode of detection.

A photodiode 31 is placed in the $\lambda + \Delta\lambda$ beam to generate a reference signal consisting of substantially constant amplitude pulses $C_1$, $C_2$ at the angular rotational frequency of the chopper 24, said pulses being in-phase with the pulses $A_1$, unit 2 and out-of-phase with the pulses $B_1$, $B_2$. The output of the photomultiplier 22 is fed to the signal input of a two-phase synchronous demodulator and amplifier unit 32. The reference signal of the photodiode 31 is fed as a reference input to the unit 32. Thus, the in-phase output of the unit 32 is representative of the $\lambda + \Delta\lambda$ signal $A_1$, $A_2$, and the out-of-phase output of the unit 32 is representative of the $\lambda$ signal $B_1$, $B_2$. These two outputs are rectified, respectively, by rectifiers 33 and 34 to generate d.c. signals of amplitude representative of the amplitude of the respective set of pulses $A_1$, $A_2$, and $B_1$, $B_2$, and these d.c. signals are applied to a d.c. differential amplifier 35, which generates an output proportional to the difference in amplitude between the two inputs. The output of the differential amplifier 35 is thus a signal representative of the difference between the absorption of the $\lambda + \Delta\lambda$ beam and the absorption of the $\lambda$ beam, which signal can be fed to any suitable readout device such as a meter 36. The meter 36 can be calibrated to 100 percent absorption of the $\lambda$ radiation by the substance detected in the sample region 10 by blocking the $\lambda$ beam; and can be calibrated to zero absorption by applying equal signals to each input of the differential amplifier 35.

The difference in absorption between the $\lambda + \Delta\lambda$ and $\lambda$ beams can alternatively be determined by inserting an optical attenuator in the $\lambda + \Delta\lambda$ beam, and measuring the amount of added attenuation required to null the output of the amplifier 35.

It should also be noted that the vapor sample in region 10 may be obtained, for example, either by vaporizing solid samples in a chamber, for example, by a flame, to generate the vapor to be analyzed, or the vapor content in the free-standing air of a given region may be analyzed. In the latter case, it may be desirable to provide an absorption chamber through which the air is circulated, the air being circulated, for example, by the chopper 24 also acting as a fan.

If the substance being detected has a stable isotope which does not occur naturally in predominant abundance, the $\lambda + \Delta\lambda$ beam may be generated by isotopically enriching the filling of one or both the discharge lamp envelopes 13 and 14. For example, where the substance to be detected in the sample region 10 is naturally occurring mercury vapor, the strong absorption wavelength $\lambda$ in the region of 2537 Angstroms is due to the predominantly-abundant isotope $Hg_{202}$, whereas the absorption due to the nonpredominantly abundant isotope $Hg_{198}$ at a nearby wavelength $\lambda + \Delta\lambda$ is substantially less. In this case, the beam containing the $\lambda$ wavelength is generated by discharge envelope 13 containing either natural mercury or mercury enriched with respect to the isotope $Hg_{202}$, and the beam containing the $\lambda + \Delta\lambda$ wavelength is generated by discharge envelope 14 enriched with respect to the isotope $Hg_{198}$. The radiation of $Hg_{198}$ is separated from the radiation of $Hg_{202}$ by an amount $\Delta\lambda$ of approximately 20 mAngstroms. The naturally occurring mercury vapor in the sample region 10 has an abundance of 29.27 percent $Hg_{202}$ and only 9.89 percent $Hg_{198}$. Although the $Hg_{198}$ isotope does not occur naturally in predominant abundance, its natural occurence is sufficient that mercury enriched with respect to said isotope can be obtained for use in the discharge envelope 14 at relatively small cost. The natural Doppler linewidth of the absorption of the $Hg_{202}$ absorption line is considerably less than the $\Delta\lambda$ value of 20 mAngstroms. Accordingly, a change in the concentration of mercury vapor in the sample region 10 affects the absorption of the beam from the discharge envelope 13 to a substantially larger degree than it affects the absorption of the beam from the discharge envelope 14. However, the separation $\Delta\lambda$ is sufficiently small that the change in absorption due to background substances will be substantially the same for both beams. Under these circumstances, the meter 36 can be calibrated to indicate the mercury atomic absorption only as previously discussed.

It is to be understood that modifications and variations of the embodiments of the invention disclosed herein may be resorted to without departing from the spirit of the invention and scope of the appended claims.

I claim:

1. Method of determining the concentration of a given substance having a naturally occurring mixture of isotopes in which there is predominant abundance of one of the isotopes in a sample which may also contain absorbing background substances, which comprises the steps of: detecting the absorption by said sample of a first radiation from a first source containing said substance, said first radiation having a predominant spectral emission line corresponding to the absorption line of said predominantly abundant isotope; detecting the absorption by said sample of a second radiation from a second source containing said substance, the substance in said second source having a concentration of a given isotope, other than said predominantly abundant isotope, which is greater than the concentration of said given isotope in said first source, whereby said second radiation has a given spectral emission line corresponding to the absorption line of said given isotope which is stronger than the corresponding spectral emission line in said first radiation, said given spectral emission line of said second radiation being separated in wavelength from said predominant spectral emission line of said first radiation by an amount sufficiently large that said second radiation is substantially less absorbed by the atomic absorption of the predominantly abundant isotope of said given substance than is said first radiation, but sufficiently small that said second radiation is absorbed by background substances substantially the same as said first radiation; and comparing said detected absorptions by said sample of said first and second radiations to thereby detect said given substance independently of any absorption by background substances.

2. Apparatus for determining the concentration of a given substance having a naturally occurring mixture of isotopes in which there is a predominant abundance of one of the isotopes in a sample which may also contain absorbing background substances, which comprises: a first irradiation source containing said substance for irradiating said sample with a first radiation having a predominant spectral emission line corresponding to the absorption line of said predominantly abundant isotope; a second irradiation source containing said substance, the substance in said second irradiation source having a concentration of a given isotope, other than said predominantly abundant isotope, which is greater than the concentration of said given isotope in said first source, for irradiating said sample with a second radiation having a given spectral emission line corresponding to the absorption line of said given isotope which is stronger than the corresponding spectral emission line in said first radiation, said given spectral emission line of said second radiation being separated from said predominant spectral emission line of said first radiation by an amount sufficiently large that said second radiation is substantially less absorbed by the atomic absorption of the predominantly abundant isotope of said given substance than is said first radiation, but sufficiently small that said second radiation is absorbed by background substances substantially the same as said first radiation; means for separately detecting the absorption of each of said first and second radiations by said sample; and means comparing said detected absorptions by said sample of said first and second radiations for indicating the concentration of said given substance substantially independently of any absorption by background substances.

3. Apparatus according to claim 2 wherein one of said irradiation sources contains said naturally occurring mixture of isotopes, and the other of said irradiation sources is enriched with respect to one of said isotopes.

4. Apparatus according to claim 2 wherein said given substance is mercury vapor, said first and second radiations are at a wavelength of approximately 2537 Angstroms, said predominantly abundant isotope is $Hg_{202}$, and said given isotope is $Hg_{198}$.

5. Apparatus according to claim 2, including: photosensitive means for generating a signal responsive to the absorption of the irradiation by said sample; means for alternately exposing said sample to said first and second radiations; phase-sensitive means for separating the signal generated by said signal generating means into two parts, one part being responsive to the absorption of said first radiation and the other part being responsive to the absorption of said second radiation; and means for comparing the amplitudes of said signal parts.